US008636027B2

(12) United States Patent
Lauber et al.

(10) Patent No.: US 8,636,027 B2
(45) Date of Patent: Jan. 28, 2014

(54) VENT WITH IMPROVED SEAL

(75) Inventors: Matthew R. Lauber, Cincinnati, OH (US); James E. Kesterman, Cincinnati, OH (US)

(73) Assignee: OPW Fueling Components Inc., Hamilton, OH (US)

( * ) Notice: Subject to any disclaimer, the term of this patent is extended or adjusted under 35 U.S.C. 154(b) by 492 days.

(21) Appl. No.: 12/835,105

(22) Filed: Jul. 13, 2010

(65) Prior Publication Data

US 2011/0011464 A1    Jan. 20, 2011

Related U.S. Application Data

(60) Provisional application No. 61/225,357, filed on Jul. 14, 2009.

(51) Int. Cl.
*F16K 17/194* (2006.01)
*F16K 24/02* (2006.01)
*F16K 21/04* (2006.01)

(52) U.S. Cl.
USPC ................ 137/533.21; 137/532; 251/356

(58) Field of Classification Search
USPC ............. 137/532, 533, 511, 533.21; 251/356, 251/357, 82
See application file for complete search history.

(56) References Cited

U.S. PATENT DOCUMENTS

| 58,625 | A | * | 10/1866 | Fancher | 251/357 |
| 117,689 | A | * | 8/1871 | Russell | 251/357 |
| 315,273 | A | * | 4/1885 | Gilbert | 251/82 |
| 1,818,249 | A | | 8/1931 | Groble | |
| 2,133,575 | A | | 10/1938 | Rosenberg | |
| 3,394,732 | A | | 7/1968 | Lisciani | |
| 4,120,314 | A | * | 10/1978 | Lissau | 137/329.4 |
| 4,449,544 | A | * | 5/1984 | Soderberg | 137/15.04 |
| 5,141,020 | A | | 8/1992 | Sunderhaus et al. | |
| 5,165,445 | A | * | 11/1992 | Vertanen | 137/493.6 |
| 5,489,041 | A | * | 2/1996 | Matthews et al. | 220/562 |
| 6,116,271 | A | | 9/2000 | Nickel | |
| 6,308,731 | B1 | * | 10/2001 | Kawasaki | 137/526 |
| 6,880,598 | B2 | | 4/2005 | Haunhorst et al. | |
| 7,000,899 | B2 | | 2/2006 | Kammerer et al. | |
| 7,186,369 | B1 | * | 3/2007 | Hardro et al. | 419/27 |
| 7,189,785 | B2 | * | 3/2007 | Okuno | 525/193 |
| 7,191,795 | B2 | | 3/2007 | Hettmann et al. | |
| 2002/0189914 | A1 | | 12/2002 | Naples et al. | |

FOREIGN PATENT DOCUMENTS

EP     1376000    1/2004

OTHER PUBLICATIONS

PCT, International Search Report and Written Opinion, International Application No. PCT/US2010/041776 (Sep. 8, 2010).

* cited by examiner

*Primary Examiner* — John Rivell
*Assistant Examiner* — Kevin Barss
(74) *Attorney, Agent, or Firm* — Thompson Hine L.L.P.

(57) ABSTRACT

A relief vent including a vent body having an opening configured to be in communication with the internal volume of a tank. The relief vent further includes a movable portion that is movable relative to the vent body. The movable portion or the vent body includes a base and a sealing member coupled thereto. At least part of the sealing member is elastically deformed to press at least a portion the sealing member against the base. The portion of the sealing member pressed against the base is positioned to sealingly engage the other one of the movable portion or the vent body.

35 Claims, 5 Drawing Sheets

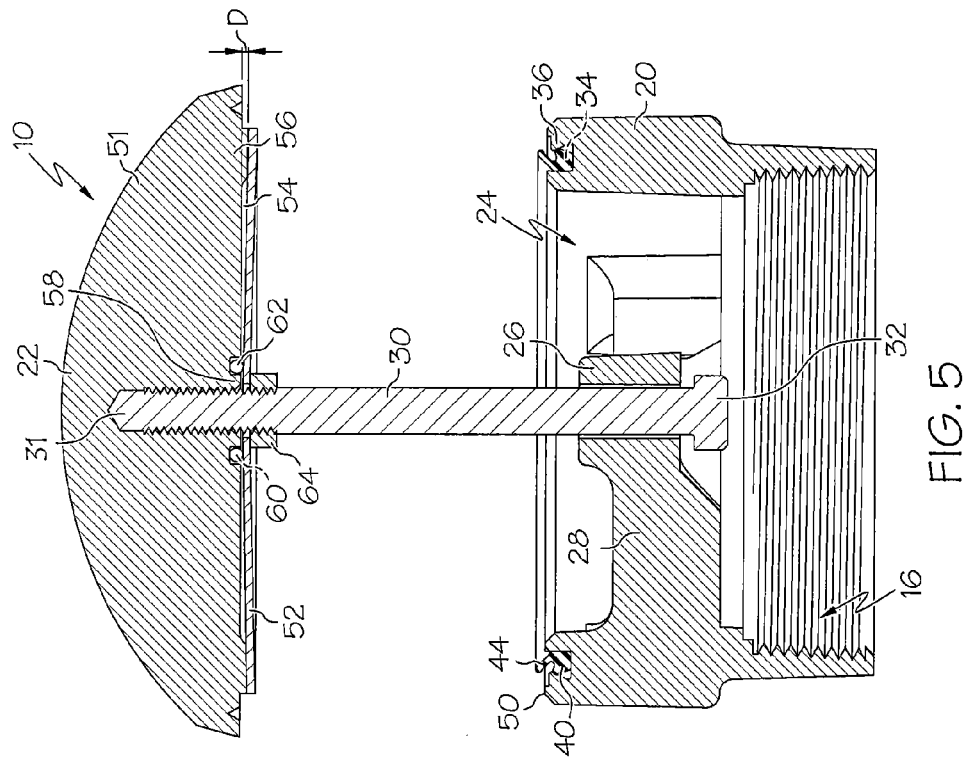
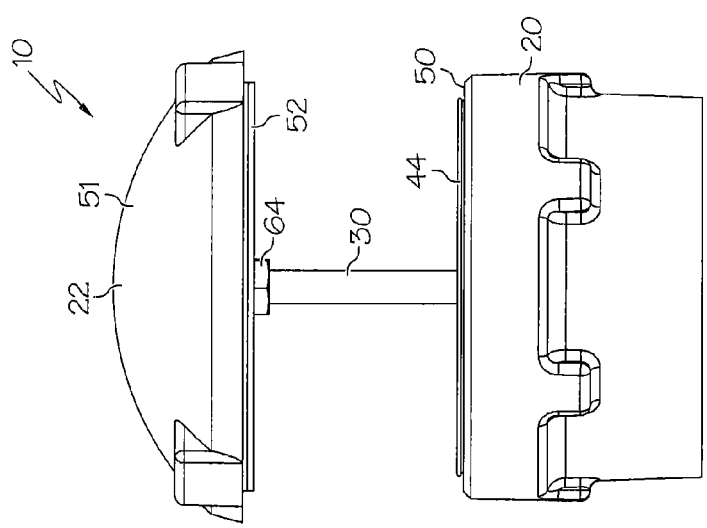

VENT WITH IMPROVED SEAL

This application claims priority to U.S. Provisional Patent Application Ser. No. 61/225,357, filed on Jul. 14, 2009, the entire contents of which are hereby incorporated by reference.

The present invention is directed to a vent for use with a storage tank, more particularly, to a vent configured to release excess pressure in a storage tank.

BACKGROUND

Vents, such as emergency vents, are often utilized in conjunction with a storage tank to prevent over-pressurization of the tank. In particular, should the pressure inside the tank increase above a threshold level, it is desired to allow excess pressure to escape, thereby preventing the creation of potentially unsafe or unstable conditions in the storage tank.

When not releasing pressure, the vent resides in a closed position in which the tank is generally desired to be sealed to prevent emissions. However, existing vents may not sufficiently seal when closed, allowing emissions to escape. The control of emissions is becoming increasingly important due to increased environmental concerns, as well as increased regulation.

SUMMARY

In one embodiment, the invention is a relief vent including a vent body having an opening configured to be in communication with the internal volume of a tank. The relief vent further includes a movable portion that is movable relative to the vent body. The movable portion or the vent body includes a base and a sealing member coupled thereto. At least part of the sealing member is elastically deformed to press at least a portion the sealing member against the base. The portion of the sealing member pressed against the base is positioned to sealingly engage the other one of the movable portion or the vent body.

BRIEF DESCRIPTION OF DRAWINGS

FIG. 4 is a side view of the vent of FIG. 2;

FIG. 5 is a side cross section of the vent of FIG. 4;

DETAILED DESCRIPTION

Figure 1:
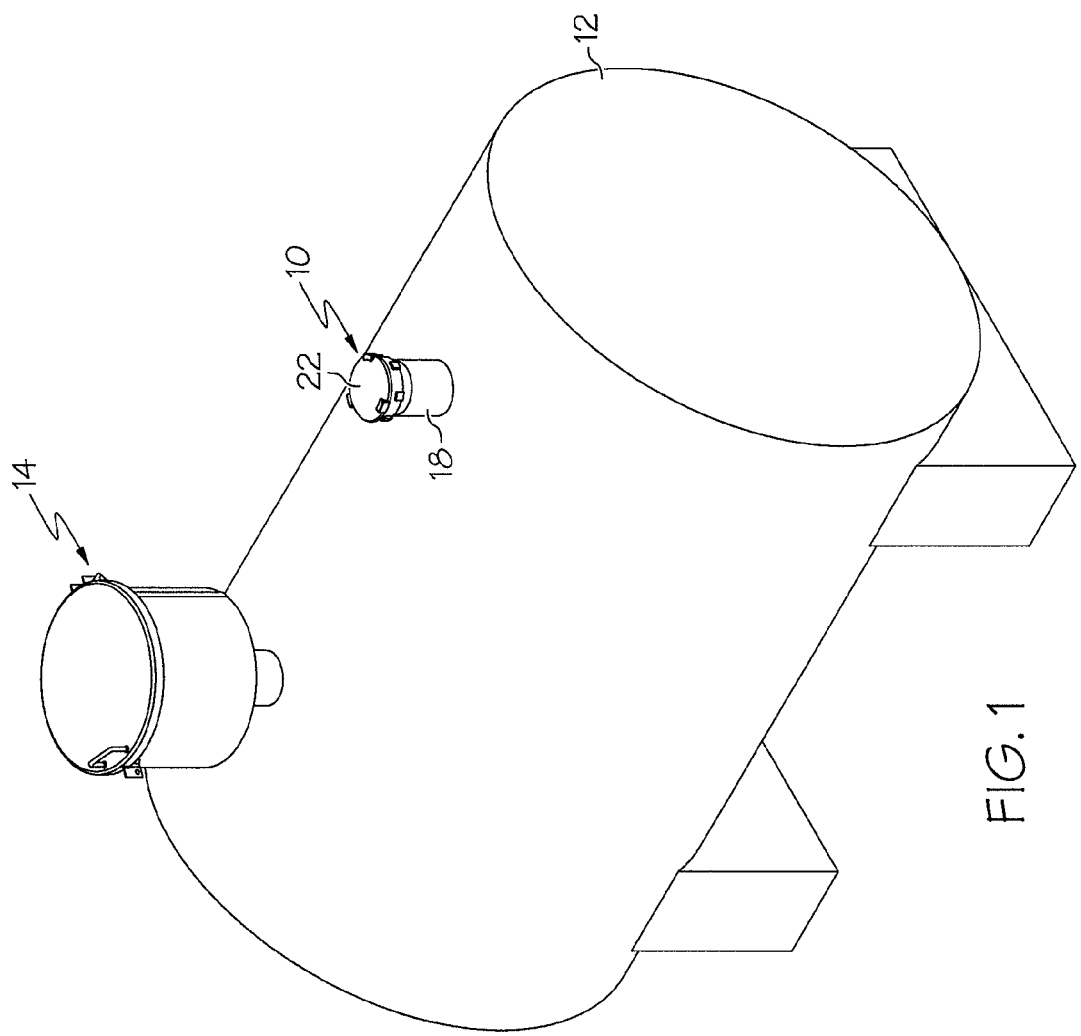
FIG. 1 is a top perspective view of a tank incorporating one embodiment of the vent of the present invention.

As shown in FIG. 1, in one embodiment the vent of the present invention, generally designated 10, is used in combination with a storage tank 12. The tank 12 may include an inner cavity for storing fluid, and a fill port 14 positioned at a top end thereof to enable refilling the tank 12. The storage tank 12 can be an above ground tank, a below ground tank, or a partially buried tank, and can have any of a wide variety of shapes and configurations, such as cylindrical or the like, and configured to store large amounts of fluid. The tank 12 may be configured to store any of a variety of fluids therein, including, but not limited to, fuels such as petroleum-based fuels including gasoline, kerosene, diesel, natural gas, biofuels, propane or the like.

Figure 3:
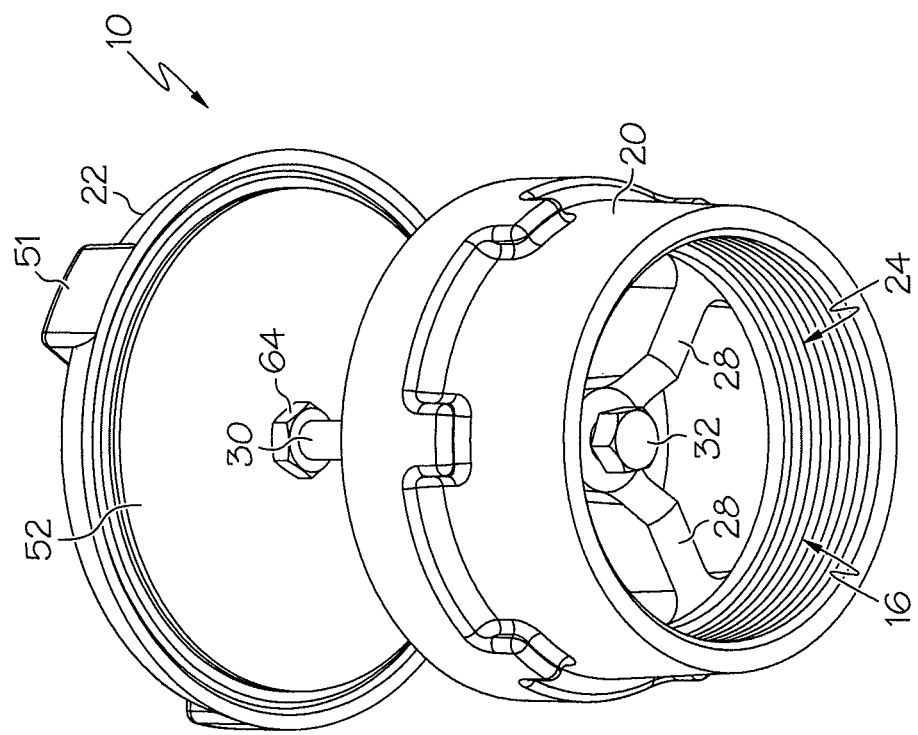
FIG. 3 is a bottom perspective view of the vent of FIG. 2.
Figure 2:
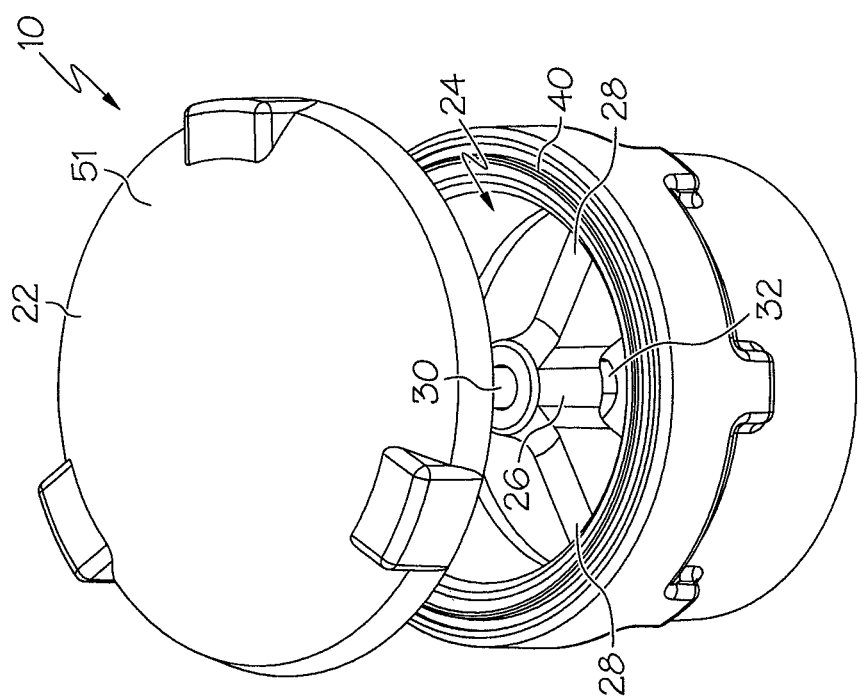
FIG. 2 is a front perspective view of the vent of FIG. 1, shown in its open position.
Figure 7:
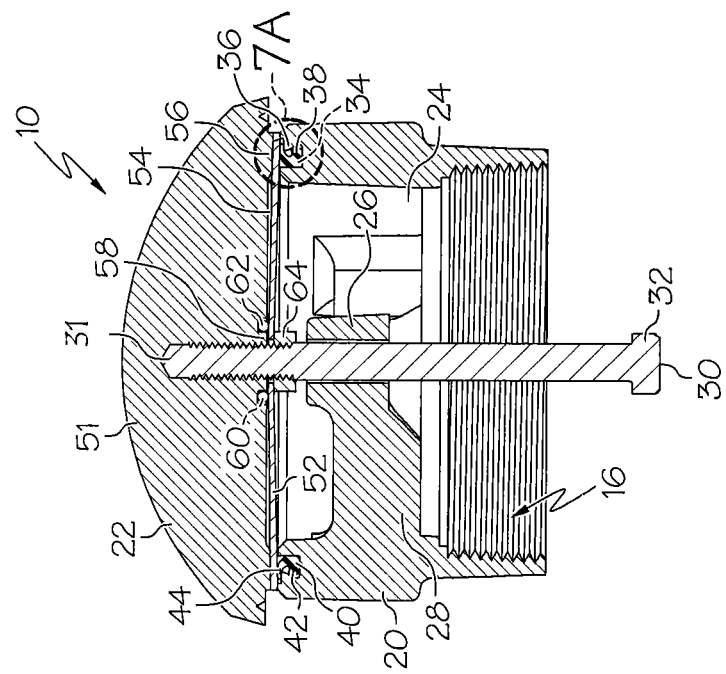
FIG. 7 is a side cross section of the vent of FIG. 6.

The vent 10 may be configured to be securely coupled to a top end of the tank 12. In particular, as shown in FIGS. 3, 5 and 7, in one embodiment the vent 10 includes internal threads 16 formed therein to enable the vent 10 to be threadably coupled to a threaded male coupling 18 of the storage tank 12. However, the vent 10 can include any of a variety of arrangements to enable the vent 10 to be coupled to the tank 12, such as male threads received in a corresponding female opening of the tank 12, welding, clamps, brackets, or other coupling mechanisms.

The vent 10 may include an annular vent body 20 and a generally disk-shaped cap, cover or cover body 22 movably coupled to the vent body 20. The vent body 20 includes an inner opening 24 that is in fluid communication with the inner volume of the tank 12. The vent 10 may take the form of a so-called "mushroom" vent, although the vent 10 can take any of a wide variety of other shapes and configurations.

The vent body 20 and cover 22 may be made of a variety of materials. However, in one embodiment, the cover 22 is generally made of cast iron to provide a durable, dense material, and the vent body 20 is made of aluminum to provide a lightweight, corrosion-resistant material. The vent body 20 may include a central guide ring 26 positioned in the inner opening 24, and a set of generally radially-extending ribs 28 extending from the guide ring 26 to the outer wall of the vent body 20 to fix the guide ring 26 in place. The cover 22 includes a guide shaft 30 is slidably received through the guide ring 26 and threadably received in a central opening 31 on the underside of the cover 22.

Figure 6:
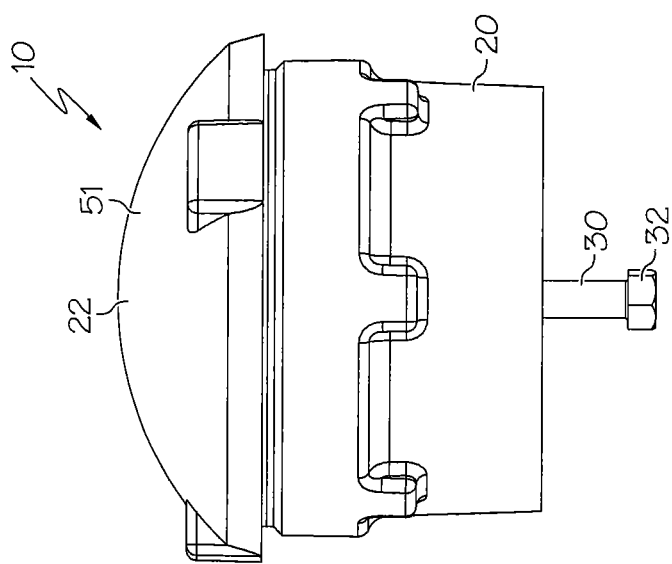
FIG. 6 is side view of the vent of FIG. 2, shown in its closed position.
Figure 8:
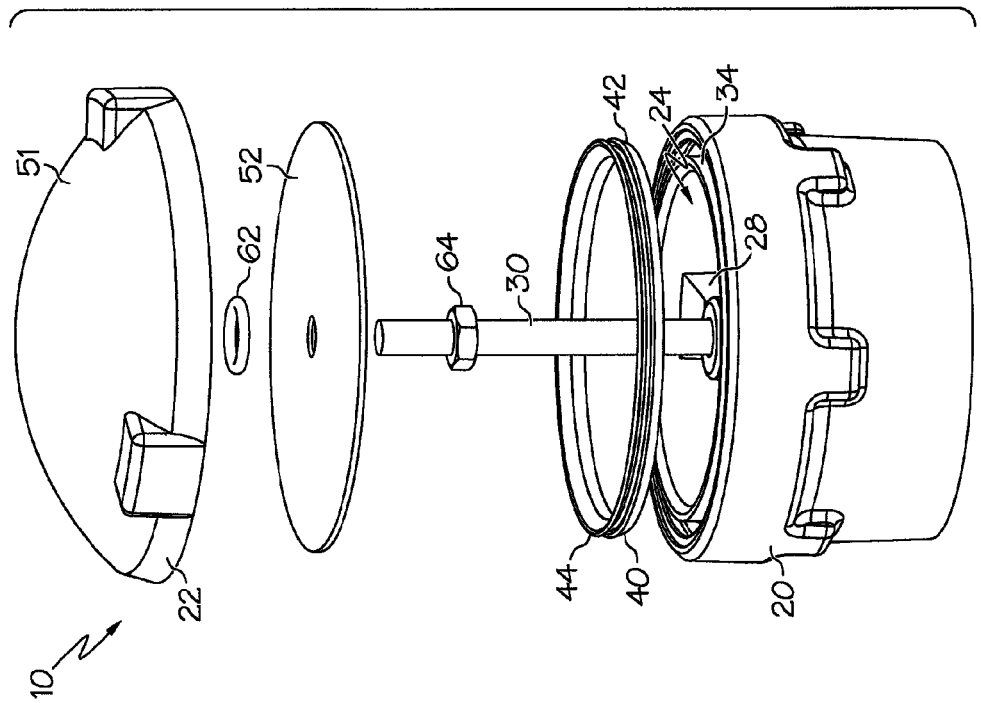
FIG. 8 is an exploded view of the vent of FIG. 2.

In operation, the vent 10 typically resides in the closed position, as shown in FIGS. 6 and 7, wherein the cover 22 engages and forms a seal with the vent body 20. Pressure in the storage tank 12 is communicated to the inner volume or opening 24 of the vent body 20, and acts upon the cover 22. When sufficient pressure is generated in the tank 12/opening 24, the weight of the cover 22 is overcome and the cover 22 moves upwardly to move the vent 10 to its open position, as shown in FIGS. 2-5 (although the cover 22 may not necessarily open to the extent shown in FIGS. 2-5). Thus, it can be seen that the weight of the cover 22 can be selected to control the opening pressure of the vent 10. The head 32 of the bolt 30 interacts with the guide ring 26 to limit upward movement of the cover 22.

When in the open position, the vent 10/cover 22 allows pressurized fluid to escape from the storage tank 12/inner volume 24 through the gap between the cover 22 and vent body 20. Once the storage tank 12/inner volume 24 is sufficiently vented, the vent 10/cover 22 returns to its closed position, as shown in FIGS. 6 and 7, due to the gravity forces/weight of the cover 22. Thus the vent 10 is gravity biased to its closed position, although it could also or instead be biased by a spring or the like. The guide shaft 30 and guide ring 26 interact to ensure a smooth opening and closing movement of the vent 10.

The integrity of the seal between the cover 22 and the vent body 20 is important to reduce or eliminate emissions escaping the vent 10/tank 12 when the vent 10 is in its closed position. However, seals for existing vents in the closed position may be unsatisfactory for various reasons. For example, the cover 22 and/or body 20 may be made of cast iron, which can be difficult to machine or form into the desired shape. Moreover, the surfaces of the cover 22 and/or body 20 may be painted for aesthetic and/or protective purposes, which further increases the challenge of creating a proper seal. Finally, machining and forming techniques used on the cover 22 and/or body 20 may also make it difficult to form circular features therein to aid in sealing annular structures.

The seal arrangement utilized herein includes a groove 34 formed about the periphery of the upper edge of the body 20. The groove 34 includes a protrusion 36 (FIG. 7A) extending radially inwardly from the radially outer edge of the groove 34. In the illustrated embodiment the protrusion 36 is defined by a lower chamfered surface 38 and an upper flat surface 39, although the protrusion 36 can take any of a wide variety of shapes and configurations.

A sealing element 40, such as a lip seal in the illustrated embodiment, is received in the groove 34. The sealing element 40 can be made of any of a wide variety of materials, such as elastic or resilient materials, including, but not limited to, rubber, synthetic rubber, elastomers, or various other natural or polymer materials which are pliable (i.e. easily manually deflectable). The sealing element 40 includes a base portion 42 and a flange or upper portion 44 extending upwardly and away from the base portion 42 defining a groove 43 therebetween. The base portion 42 is received in the groove 43 and trapped below the protrusion 36 to securely retain the sealing element 40 in place.

In the absence of outside forces, as shown in FIGS. 4 and 5, the flange 44 of the sealing element 40 may extend generally upwardly and radially outwardly, and be positioned above the upper edge 50 of the vent body 20. However, it should be understood that the arrangement of the sealing element 40 and groove 34 could be reversed such that the protrusion 36 is positioned on the radially inner surface of the groove 34, in which case the sealing element 40 would also be reversed so that the flange 44 faces the opposite direction and is angled radially inwardly. Moreover, the sealing element 40 can have any of a wide variety of shapes and configurations beyond that shown herein.

The cover 22 includes a base 51 and a sealing member or plate 52 coupled thereto and compressed against the base 51. The cover 22 may include a recess 54 positioned on the underside thereof (FIGS. 5 and 7A), and positioned between an outer ring or surface 56 and an inner ring or surface 58. The inner ring 58 and outer ring 56 both extend axially forwardly from an underside of the cover 22, and the outer ring 56 is generally radially aligned with the groove 34/sealing element 40 of the body 20. In the illustrated embodiment, the outer ring 56 also extends axially forwardly relative to the inner ring 58 by the distance D (see FIG. 5). Moreover, in the illustrated embodiment the recess 54 has its maximum height adjacent to the outer ring 56, and gradually tapers and reduces in height toward the inner ring 58/central opening 31 of the cover 22. Alternately, the recess 54 may be a generally uniform in height. A groove 60 is positioned about the inner ring 58, and receives an O-ring 62 or the like therein to provide a resilient surface against which the sealing plate 52 can be biased.

The sealing plate 52 may be generally flat and planar in the absence of outside forces. The sealing plate 52 may also be made of a relatively stiff material, such as metal, such that when the sealing plate 52 is elastically deformed (as described in greater detail below) the sealing plate 52 exerts a sufficient flattening/sealing force. For example the sealing plate 52 may have a Young's modulus of at least about ten GPa and/or less than about four hundred GPa.

The sealing plate 52 is bolted or otherwise coupled to the cover base 51 by a nut 64 which is threaded onto the bolt 30 and traps the central part of the sealing plate 52 between the nut 64 and the inner surface or ring 58 and/or O-ring 62. Because the inner ring 58/O-ring 62 is axially recessed relative to the outer ring 56, the plate 52 is placed into tension when the nut 64 is tightened down such that the outer portion of the plate 52 is pressed against the outer ring 58. In this manner, when the sealing plate 52 is bolted in place and put in tension, any gaps between the sealing plate 52 and the outer ring 56 are reduced or eliminated. Thus the sealing plate 52 conforms to any out-of flatness about the outer ring 56 and is pressed flush into contact with the outer ring 56, providing a uniform, flat sealing surface.

The sealing plate 52 may be elastically deformed in the axial direction when the nut 64 is tightened down. In particular, the sealing plate 52 may be urged out-of-plane or otherwise moved out of its undeformed shape by between about $1/10$ and about $1/1000$ of the diameter (or effective or average diameter) of the sealing plate 52, and more specifically between about $1/100$ and $1/1000$ of the diameter. Thus the distance D, which represents the axial distance the inner ring 58 is axially recessed relative to the outer ring 56, may be at least about $1/1000$ (or $1/100$), but less than about $1/10$, of the diameter (or effective or average diameter) of the outer ring 56.

Figure 7A:
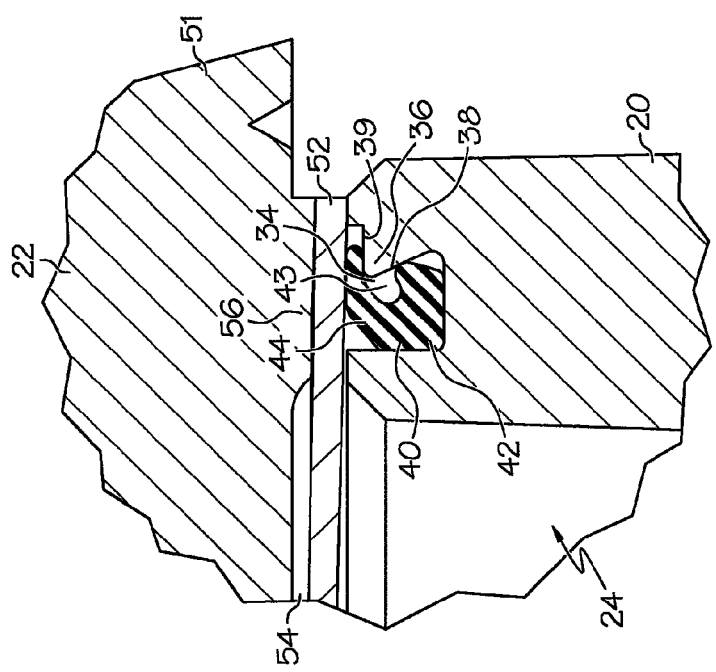
FIG. 7A is a detail of the area designated in FIG. 7.

When the vent 10 is in the closed position, as best shown in FIG. 7A, the outer portions of the sealing ring 52 are urged into a flat surface due to the tension forces exerted thereon and forms a fluid-tight seal with the upper flange 44 of the sealing element 40 in a flat surface-to-surface engagement. When the vent 10 is in the closed position, the upper flange 44 of the sealing element 40 is deflected downwardly, which causes the flange 40 to form a tight seal with the sealing plate 52. In particular, the desire of the flange 44 to spring upwardly and return to its natural, undeflected shape also helps to reduce or eliminates any gaps between the flange 44 and the sealing plate 52. Thus, the sealing element 40/sealing plate 52, and sealing plate 52/outer ring 56 cooperate to form a tight seal therebetween.

The sealing plate 52 can be made of any wide variety of materials, such as stainless steel, plastic, fiberglass aluminum or the like. In this manner, the sealing plate 52 can be made of a material that is distinct from the material of the cover 22 so that the sealing plate 52 provides a smooth corrosion-resistant surface, while the remainder of the cover 22 can be made of cast iron or the like to provide the desired weight to the cover 22. In previous system the sealing surface (i.e. the surface of the movable portion engaging a lip seal or the like) could often be made of painted cast-iron, which does not provide a good sealing surface. The sealing plate 52 may contribute to only a fraction of the weight of the cover 22, such as less than about 10% or 5%, and the majority of the weight may be provided by the base 51, which can be cast iron or the like.

The plate 52 can take other shapes besides disc-shaped or flat. For example, a center portion of the plate may extend out-of-plate in its undeformed shape, and be pressed closer to in-plane, or further out-of-plane, by the nut 64. In addition, the plate 52 need not necessarily be generally flat and planar, and could be shaped as a conical section, hemispherical, etc.

In an alternate embodiment, the position of the sealing plate 52 and the sealing element 40 can be reversed. In particular the sealing plate 52 can be positioned on the vent body 20 and the sealing element 40 can be positioned on the cover 22. In this case the sealing plate 52 may not take the form of a continuous disk, as such a shape may seal the inner opening 24 and impede venting. In this case, then, the sealing plate or member 52 may include various openings or gaps formed therein. The sealing member 52 may take the form of a ring coupled to the vent body 20 by a compression fit, by threading the sealing member 52 into the vent body 20 with a thread sealant or a gasket, casting the sealing member 52 into the vent body 20, etc. Alternatively, the vent body 20 can be substantially or entirely made of the material of the sealing plate 52, such as stainless steel such that the sealing plate 52 is integrally or unitarily formed with the vent body 20, or part thereof, as a single piece. Thus, in one case, at least one of the sealing surfaces of the vent 10 is made of a non-corrosive and/or smooth (i.e. having a surface roughness of less than about 150 microns) material.

Although the invention is shown and described with respect to certain embodiments, it should be clear that modifications will occur to those skilled in the art upon reading and understanding the specification, and the present invention includes all such modifications.

What is claimed is:

1. A relief vent comprising:
    a vent body having an opening configured to be in communication with the internal volume of a tank; and
    a movable portion that is movable relative to said vent body, wherein the movable portion or the vent body includes a base and a sealing member coupled thereto, and wherein a radially inner portion of said sealing member is elastically deformed to press a radially outer portion of said sealing member against said base, wherein said portion of said sealing member pressed against said base is positioned to sealingly engage the other one of said movable portion or said vent body; wherein the other one of the vent body or the movable portion includes an elastic or resilient seal carried thereon, said seal being configured to sealingly engage said portion of said sealing member pressed against said base.

2. The vent of claim 1 wherein said movable portion includes said base and said sealing member coupled thereto, and wherein said portion of said sealing member pressed against said base is configured to sealingly engage said vent body.

3. The vent of claim 1 wherein said movable portion is movable between a closed position, wherein the movable portion generally sealingly engages the vent body, and an open position, wherein the movable portion generally does not sealingly engage the vent body to allow venting thereof, and wherein said sealing member is configured to generally form a seal with the other one of the vent body or the movable portion when the movable portion is in the closed position.

4. The vent of claim 3 wherein said movable portion is biased into said closed position.

5. The vent of claim 4 wherein said vent is configured such that when sufficient pressure is generated in said internal volume said pressure causes said movable portion to move to said open position to allow at least some of said pressure from said internal volume to be vented, after which said movable portion automatically moves to said closed position.

6. The vent of claim 1 wherein said inner portion of said sealing member is engaged to cause said elastic deformation, and wherein said outer portion pressed against said base is an outer portion of said sealing member spaced away from said inner portion.

7. The vent of claim 6 wherein said outer portion of said sealing member is pressed against an outer portion of said base.

8. The vent of claim 7 wherein said outer portion of said base extends axially forwardly relative to adjacent areas of said base.

9. The vent of claim 6 wherein said inner portion of said sealing member is pressed against an inner portion of said base, and wherein said inner portion of said base extends axially forwardly relative to adjacent areas of said base.

10. The vent of claim 9 wherein said movable portion is biased into said closed position solely by a weight of said movable portion.

11. The vent of claim 6 wherein said base includes a radially inner portion and a radially outer portion with a recessed area therebetween that is recessed relative to both said inner portion and said outer portion, and wherein said sealing member is coupled to said base such that said sealing member simultaneously contacts both said radially inner portion and said radially outer portion of said base.

12. The vent of claim 11 wherein said radially inner portion of said base is recessed, in the axial direction, relative to said radially outer portion of said base.

13. The vent of claim 6 further comprising a threaded fastener engaging said sealing member and urging said inner portion of said sealing member against a radially inner portion of said base.

14. The vent of claim 1 wherein said sealing member is generally flat and planar in the absence of outside forces, and wherein said sealing member is elastically deformed out of plane to press said portion of said sealing member against said base.

15. The vent of claim 1 wherein said seal has a deflectable lip portion extending generally toward the sealing member when said movable portion does not sealingly engage said vent body, and wherein the movable portion and lip are configured such that said movable portion engages said lip portion and deflects the lip portion when the movable portion sealingly engages said vent body.

16. The vent of claim 1 wherein said sealing member is elastically deformed by at least about $1/1000$, but less than about $1/100$, of a diameter of the sealing member.

17. The vent of claim 1 wherein said vent body is mounted on a tank and said opening is in communication with said internal volume of said tank.

18. The vent of claim 1 wherein said portion of said sealing member pressed against said base and configured to sealingly engage the other one of said movable portion or said vent body has a smoothness of less than about 150 microns.

19. The vent of claim 1 wherein said sealing member has a Young's modulus of at least about 10 GPa.

20. The vent of claim 1 wherein said sealing member is made of metal.

21. The vent of claim 1 wherein said pressure is vented from the internal volume of said tank directly to the ambient environment.

22. The vent of claim 1 wherein said vent is configured such that when sufficient pressure is present in said internal volume said pressure automatically causes said movable portion to move to allow at least some of said pressure from said internal volume to be vented.

23. The vent of claim 1 wherein said base includes a radially inner portion and a radially outer portion with a recessed area therebetween, and wherein said sealing member is coupled to said base such that said sealing member simultaneously contacts both said radially inner portion and said radially outer portion of said base and does not contact said recessed area.

24. A relief vent comprising:
    a vent body having an opening configured to be in communication with the internal volume of a tank; and
    a movable portion that is movable between a closed position, wherein the movable portion generally sealingly engages the vent body, and an open position, wherein the movable portion generally does not sealingly engage the vent body to allow venting thereof, wherein the movable portion includes a base and a metal sealing member coupled thereto, wherein an inner portion of said sealing member engages an inner portion of said base and is elastically deformed to directly cause an outer portion of said sealing member to be urged against an outer portion of said base, and wherein said sealing member is configured to generally form a seal with the vent body when the movable portion is in the closed position.

25. A relief vent comprising:
a vent body having an opening configured to be in communication with the internal volume of a tank, said vent body having a sealing portion and
a movable portion that is movable relative to said vent body, wherein the movable portion includes a base and a sealing member which is a separate and discrete piece of material from said base, wherein said sealing member is coupled to said base and positioned to sealingly engage said sealing portion of said vent body, wherein said sealing member is elastically deformed by a force applied at a radially inner portion of said sealing member and is in tension with said base when said movable portion is spaced away from said vent body in an open position, and wherein said sealing member has a Young's modulus of at least about 10 GPa.

26. The vent of claim 25 wherein said sealing member is made of a material which is more corrosion resistant than said base, or smoother than said base, or both.

27. The vent of claim 25 wherein said sealing member is made from material having differing material properties than those of said base.

28. The vent of claim 25 wherein said movable portion is movable between a closed position, wherein the movable portion generally sealingly engages the vent body, and an open position, wherein the movable portion generally does not sealingly engage the vent body to allow venting thereof, and wherein said sealing member is configured to generally form a seal with the sealing portion when the movable portion is in the closed position.

29. The vent of claim 28 wherein said sealing portion is a lip seal extending generally around the perimeter of said vent body, said lip seal being engaged and deflected by said movable portion when said movable portion is in said closed position.

30. The vent of claim 25 wherein said sealing member is a generally flat, planar metal disk.

31. The vent of claim 25 wherein at least part of said sealing member is elastically deformed to press at least a portion said sealing member against said base.

32. The vent of claim 25 wherein said sealing portion extends around a perimeter of said vent body, and wherein said sealing member extends around a perimeter of said movable portion.

33. A relief vent comprising:
a vent body having a sealing surface and an opening configured to be in communication with the internal volume of a tank; and
a movable portion that is movable between a closed position, wherein the movable portion generally forms a seal with the vent body, and an open position, wherein the movable portion generally does not form a seal with the vent body to allow venting thereof, the movable portion includes a sealing surface that engages the sealing surface of the vent body to form the seal, wherein the at least one of the sealing surfaces is made of a material that is corrosion resistant, or has a smoothness of less than about 150 microns, or both, and wherein said sealing surface of said movable portion has a Young's modulus of at least about 10 GPa.

34. A relief vent comprising:
a vent body having an opening configured to be in communication with the internal volume of a tank; and
a movable portion that is movable relative to said vent body, wherein the movable portion or the vent body includes a base and a sealing member coupled thereto, and wherein at least part of said sealing member is elastically deformed to press at least a portion of said sealing member against said base regardless of whether said movable portion is in an open position or a closed position, wherein said portion of said sealing member pressed against said base is positioned to sealingly engage the other one of said movable portion or said vent body, and wherein said movable portion is biased into the closed position in which said movable portion sealingly engages said vent body solely by a weight of said movable portion.

35. A relief vent comprising:
a vent body having an opening configured to be in communication with the internal volume of a tank; and
a movable portion that is movable relative to said vent body, wherein the movable portion or the vent body includes a base and a sealing member coupled thereto, and wherein a radially inner portion of said sealing member is elastically deformed to press a radially outer portion of said sealing member against said base, wherein said portion of said sealing member pressed against said base is positioned to sealingly engage the other one of said movable portion or said vent body;
wherein said base includes a radially inner portion and a radially outer portion with a recessed area therebetween, and wherein said sealing member is coupled to said base such that said sealing member simultaneously contacts both said radially inner portion and said radially outer portion of said base and does not contact said recessed area.

* * * * *